US008827391B2

(12) United States Patent
Mazur

(10) Patent No.: US 8,827,391 B2
(45) Date of Patent: Sep. 9, 2014

(54) CONCURRENTLY DIGITALLY PRINTING/MARKING AN IMAGE WITH A CIRCUIT

(71) Applicant: Xerox Corporation, Norwalk, CT (US)

(72) Inventor: Christopher A. Mazur, Henrietta, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 13/972,474

(22) Filed: Aug. 21, 2013

(65) Prior Publication Data

US 2013/0335472 A1 Dec. 19, 2013

Related U.S. Application Data

(63) Continuation-in-part of application No. 11/805,599, filed on May 23, 2007, now abandoned.

(51) Int. Cl.
*B41J 3/44* (2006.01)
*G06F 3/12* (2006.01)
*H04N 1/32* (2006.01)
*B41J 2/045* (2006.01)

(52) U.S. Cl.
CPC ........... *B41J 2/04528* (2013.01); *G06F 3/1256* (2013.01); *H04N 1/32101* (2013.01); *G06F 3/1208* (2013.01); *G06F 3/1285* (2013.01); *H04N 2201/3274* (2013.01); *G06F 3/1243* (2013.01); *H04N 2201/3225* (2013.01); *H04N 2201/3273* (2013.01)
USPC ................................................ 347/2; 347/85

(58) Field of Classification Search
CPC ................................ H05K 3/125; B41J 29/40
See application file for complete search history.

(56) References Cited

U.S. PATENT DOCUMENTS

| | | | |
|---|---|---|---|
| 5,995,724 A | 11/1999 | Mikkelsen et al. |
| 6,061,698 A | 5/2000 | Chadha et al. |
| 6,415,284 B1 | 7/2002 | D'Souza et al. |
| 6,765,689 B1 | 7/2004 | Benstein |
| 6,882,441 B1 | 4/2005 | Faust et al. |
| 7,013,482 B1 | 3/2006 | Krumel |

(Continued)

OTHER PUBLICATIONS

Fabio Giannetti et al., "HP White Paper Anvil: VDP Segmented Workflow Toolset," Article, Release Version 1.01, Copyright 2007, Hewlett-Packard Development Company, L.P., 13 pages.

(Continued)

*Primary Examiner* — Shelby Fidler
(74) *Attorney, Agent, or Firm* — Fay Sharpe LLP

(57) ABSTRACT

In one version, variable data digital printing where certain record images are selected from a database and user designated variable data is entered into the selected record images creating personalized images. Data tags are inserted into the personalized images which are stored. The stored personalized images are scanned for specified tags; and, the results of the scan identified to the user for verification of accuracy. Provision is made for image display and correction, and inputs may be entered from a user interface prior to printing. Another version provides for supplying heated individual colorant resin to printheads for printing on print media. Heated conductive resin is supplied to a separate printhead for concurrently printing continuously conductive resin as a circuit having discrete information therein with the printed image thus forming a concurrently printed RFID tag. In another version, heated electrolyte substrate is printed with the image and separately conductive resin is printed on the substrate as a pair of electrodes to form a battery circuit.

9 Claims, 5 Drawing Sheets

(56) References Cited

U.S. PATENT DOCUMENTS

| | | |
|---|---|---|
| 7,137,064 B2 | 11/2006 | Kuppinger et al. |
| 7,379,946 B2 | 5/2008 | Carus et al. |
| 7,533,118 B2 | 5/2009 | Chaudri |
| 7,542,160 B2 | 6/2009 | Parry et al. |
| 8,170,270 B2 | 5/2012 | Mansell et al. |
| 2003/0038972 A1 | 2/2003 | Benstein |
| 2003/0122905 A1* | 7/2003 | Suzuki et al. ............... 347/85 |
| 2003/0231234 A1* | 12/2003 | Ushirogouchi et al. ...... 347/100 |
| 2004/0104274 A1* | 6/2004 | Kotik et al. .................. 235/492 |
| 2005/0018011 A1* | 1/2005 | Nelson ........................ 347/40 |
| 2005/0216830 A1 | 9/2005 | Turner et al. |
| 2006/0026151 A1 | 2/2006 | Greene et al. |
| 2006/0055539 A1* | 3/2006 | Lawrence et al. .......... 340/572.7 |
| 2006/0227193 A1* | 10/2006 | Leighton .................... 347/99 |
| 2007/0057050 A1* | 3/2007 | Kuhno et al. ................ 235/383 |
| 2007/0076278 A1 | 4/2007 | Nagarajan |
| 2009/0066517 A1* | 3/2009 | Erikson ....................... 340/572.7 |
| 2010/0059596 A1* | 3/2010 | Achhammer ................ 235/492 |
| 2010/0323102 A1* | 12/2010 | Chopra et al. ............... 427/125 |

OTHER PUBLICATIONS

Vega-Riveros et al, "A Hybrid Intelligence Approach to Artifact Recognition in Digital Publishing," Research Article conducted with grant from Hewlett Packard under the Digital Publishing Research Program in Collaboration with Purdue University and HP Labs, 10 pages.

"EFI Digital StoreFront Production Workflow Solutions," Brochure, 3 pages, 300 Velocity Way, Foster City, CA 94404.

* cited by examiner ately at 10; and, the system operates at step 20, through a user input interface, to provide for user entry of instructions and commands. The system proceeds from the interface with user input at step 20 to step 22 for the design of the image template; and, variable data is inputted from a database at step 24. The system then proceeds to emit personalized images in step 26 with the variable data entered in step 24 onto each personalized image. The system then proceeds to step 28 to store the
CONCURRENTLY DIGITALLY PRINTING/MARKING AN IMAGE WITH A CIRCUIT This application is a Continuation-in-Part of U.S. patent application Ser. No. 11/805,599, filed May 23, 2007 by Christopher A. Mazur and entitled "PRE-PRESS PROOFING IN DIGITAL PRINTING", and is incorporated herein by reference in its entirety.

BACKGROUND

The present disclosure relates to digital printing and particularly, to printing jobs where variable information from a database is digitally entered automatically into a template for a particularly selected print job. Variable data printing offers the advantage that a personalized or customized document can be created and printed automatically from a database of information without the need to manually perform a pre-press arrangement of the information on the page to be printed or individually on an image page.

However, where the print job requires many personalized page images to be generated from information in the database; and, where accuracy of the information extracted from the database for each personalized image is critical as, for example, where medical, financial or employee information is involved, it is necessary to proof each page for accuracy. Heretofore, there has been no way of enabling the user or person ordering the print job to verify the data entered into the personalized images prior to printing to insure that the proper information has been extracted from the database and entered correctly into the personalized images. Thus, it has been desired to provide in a digital variable data print job a way or means of automatically proof checking or verifying the particular images to be printed, prior to printing.

It has also been desired to provide digitally marked or printed images with discrete identification. Such as, for example, personnel name, serial number, model number, size, weight, or color where the image is printed/marked on packaging or wrapping material for manufactured products. Heretofore, discretization has been accomplished by attaching a separate printed circuit to the printed image or to an article to which image is attached. The circuit, when energized by an electromagnetic wave, such as a radio frequency wave, and known in the art as an RFID tag provides this discrete identification, such as serial number, model number, size, weight or color. This need to apply a tag has proven costly and complex and, thus, it has been desired to provide a more cost effective way or means of personalizing or discretizing a digitally printed or marked image, particularly for packaging and wrapping material.

BRIEF DESCRIPTION

In one embodiment, the present disclosure describes a method and system for variable data printing from digital images which addresses the above-described problem and provides, through a user interface, for inputting the requirements for design of the variable data image and for selecting records from a database of record images according to a set of instructions. The system then automatically enters the user designated variable data into the selected record images and thus creates personalized or customized images. The personalized images are stored and data tags are entered into the information of each of the stored personalized images. A scan is then made of the stored personalized images for the data tags and the results of the scan are filtered and the results provided to the user for user verification of the integrity of the information in the personalized images. If the user determines that the information inputted from the database into the personalized images is not correct, provision is made for the user to input corrections at the user input interface. The personalized images are reconfigured with respect to the variable data, rescanned and presented to the user for verification. Upon user verification that the personalized images are acceptable, the personalized images are released to the print engine for execution of the print job.

In another embodiment, the system of the present disclosure concurrently digitally prints/marks a circuit containing discrete identification information on or with a personalized image. The circuit may then be scanned with an electromagnetic wave usually of radio frequency, resulting in the circuit being operative to emit the discrete identification information. The concurrent printing/marking of the circuit with the selected printed/marked image eliminates the need to physically attach an RFID tag.

DETAILED DESCRIPTION

Figure 1:
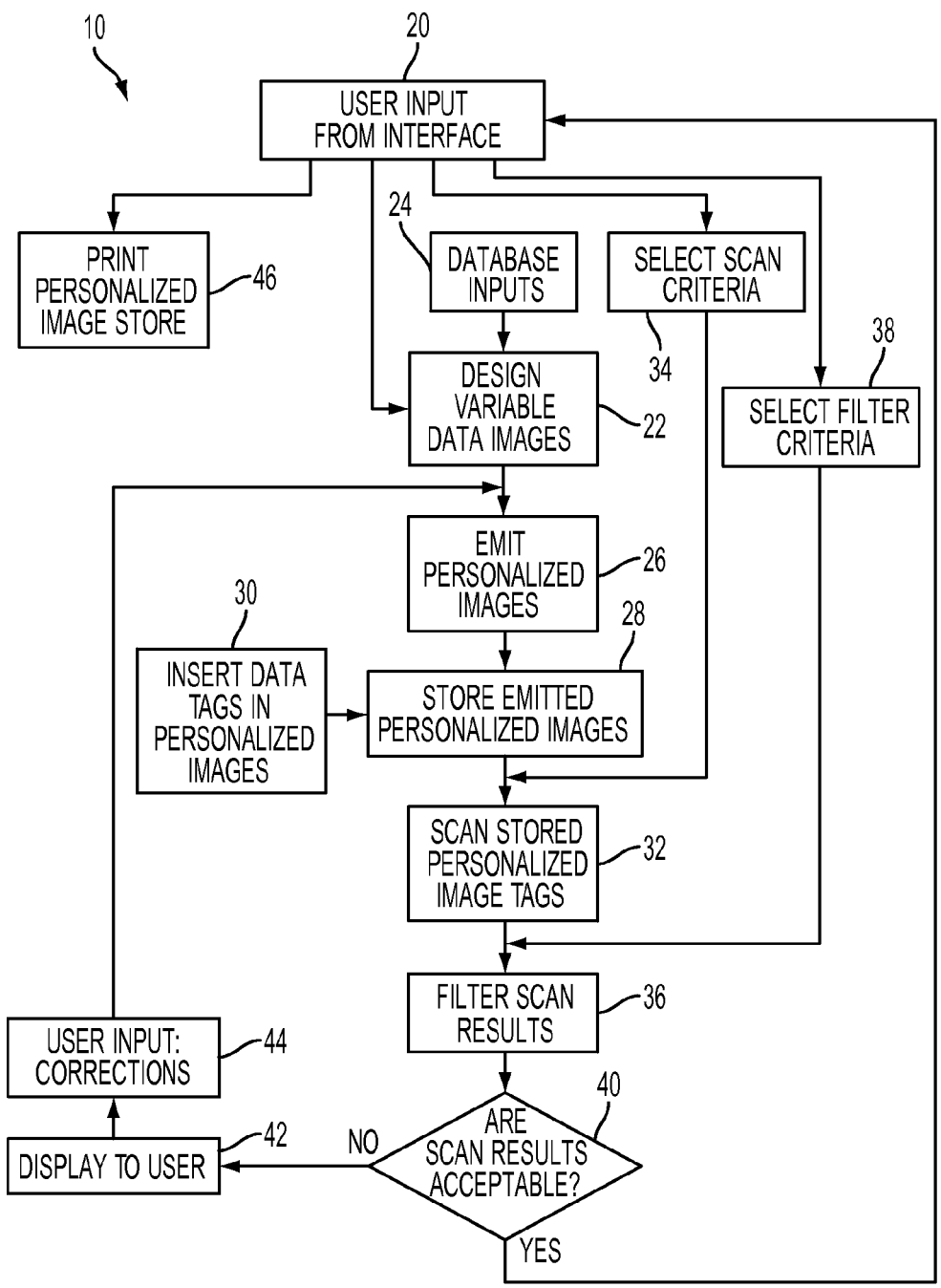
FIG. 1 is a block flow diagram of one version of the method of the present disclosure.

Referring to FIG. 1, a block diagram for practicing a method of the present disclosure is indicated generally at 10; and, the system operates at step 20, through a user input interface, to provide for user entry of instructions and commands. The system proceeds from the interface with user input at step 20 to step 22 for the design of the image template; and, variable data is inputted from a database at step 24. The system then proceeds to emit personalized images in step 26 with the variable data entered in step 24 onto each personalized image. The system then proceeds to step 28 to store the personalized images emitted at step 26 and to have data tags for the variable information inserted at step 30 into the stored images of step 28.

The system then proceeds to step 32 and scans the stored personalized images for the data tags based upon selected scan criteria set by the user at step 34 and inputted to the scanning process at step 32.

The system then proceeds to filter the results of the scan at step 36 based upon user selected filter criteria set at step 38 and inputted to the process of step 36.

The system then proceeds to step 40 and inquires as to whether the scan results are acceptable; and, if the determination of step 40 is affirmative, the results are displayed to the user at the user interface as indicated by the return arrow to step 20. However, if the determination of step 40 is negative the results are displayed to the user at step 42; and, user input for corrections are entered at step 44 and these are inputted to step 26 for correcting the personalized images. When acceptable scan results are verified by the user by affirmative determination at step 40, the user may then input a command to release the personalized images for printing at step 46.

Figure 2:
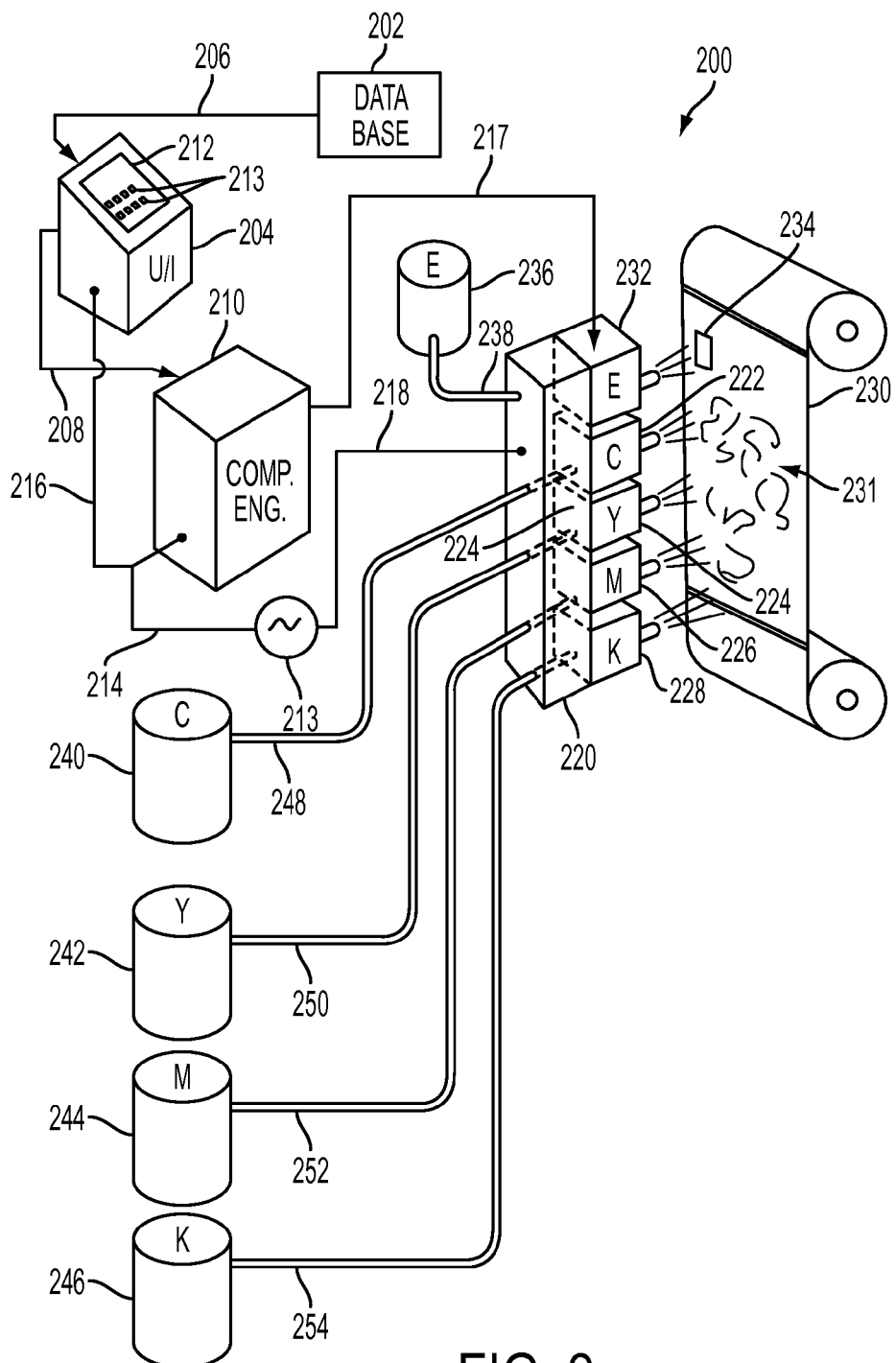
FIG. 2 is a schematic diagram of a system for producing another version of the method of the present disclosure for concurrently digitally printing/marking a circuit having discrete information with an image.

Referring to FIG. 2, another version of a system for practicing the method in accordance with the present disclosure is indicated generally at 200 and includes a data base 202 which may contain a variety of stored images which are accessible through connection to a user interface 204 as indicated by signal line 206. User interface 204 is connected as indicated by signal line 208 to a composition engine 210 which is operative to generate digital signals indicative of the images; and, the composition engine 210 may contain a raster image processor. The user interface is operative to display the images on a screen 212 and has provision such as a keypad or touch sensitive input panel 213 for user inputs to modify the images or add discrete information. The composition engine 210 and the user interface 204 receive power from a power supply 213 respectively along power lines 214, 216. The power supply 213 is also connected along power line 218 to a heater 220.

The heater 220 has attached thereto individual printheads for printing cyan (C), yellow (Y), magenta (M) and black (K) colorant denoted respectively by reference numerals 222, 224, 226 and 228. The printheads are of the droplet generator and nozzle type and are operative to discharge heated colorant in a fluid state onto a web of print media 230 as will hereinafter be described. Although the print media 230 is illustrated in the form of a continuous web, it will be understood that, alternatively, sheet stock may be employed. An additional printhead 232 is attached to the heater for discharging material to mark or print a circuit 234 onto the print media 230. The composition engine 218 generates digital signals for an image and provides signals along signal line 217 to each of the printheads 222, 224, 226, 228, 232.

The printhead 232, marked with the character E in FIG. 2, receives a supply of continuously conductive resin which is supplied from a reservoir 236 of particulate or gelatinous continuously conductive resin material supplied through conduit 238 passing through heater 220 to printhead 232. The heater 220 is operative to heat the particles or gel of continuously conductive resinous material to a fluid state in the conduit prior to entering the printhead 232. In the present practice, the continuously conductive resinous material may include metallic particles, of one of copper, silver, aluminum, nickel and any combination thereof for providing a desired conductivity. In the present practice, it has been found satisfactory to use continuously conductive resinous particles having a particle size of about 0.5 mm. In the present practice it has been found satisfactory to use resin particles obtained from Parmod/Parelec LLC, Rocky Hill, N.J.; however, other continuously conductive resinous particulate material may be used.

Individual containers (tanks) or reservoirs of particulate resinous colorant are provided for cyan (C), yellow (Y), magenta (M), and black (K) colorant indicated, respectively, 240, 242, 244, 246, and provide a flow of particles of resinous colorant material through, respectively, conduits 248, 250, 252, 254, which pass through the heater 220 for supplying heated colorant in a fluid state to the printheads, respectively, 222, 224, 226, 228. In the present practice, it has been found satisfactory to have the colorant resinous material in the particulate form for each of the C, Y, M, K colorants employ a particle size of about 0.5 mm. It will be understood that the circuit 234 may be located on the media web 234 illustrated as a continuous web coincident with, e.g. on, or immediately adjacent the image to be printed as indicated generally at 231.

In the present practice, the print media may comprise any of paper, paperboard, cardboard, plastic and textile material, non-conductive metal, composite, ceramic, and any combination thereof, and may be packaging or wrapping material. Alternatively, the print media may be the surface presented by an article of manufacture.

Figure 3:
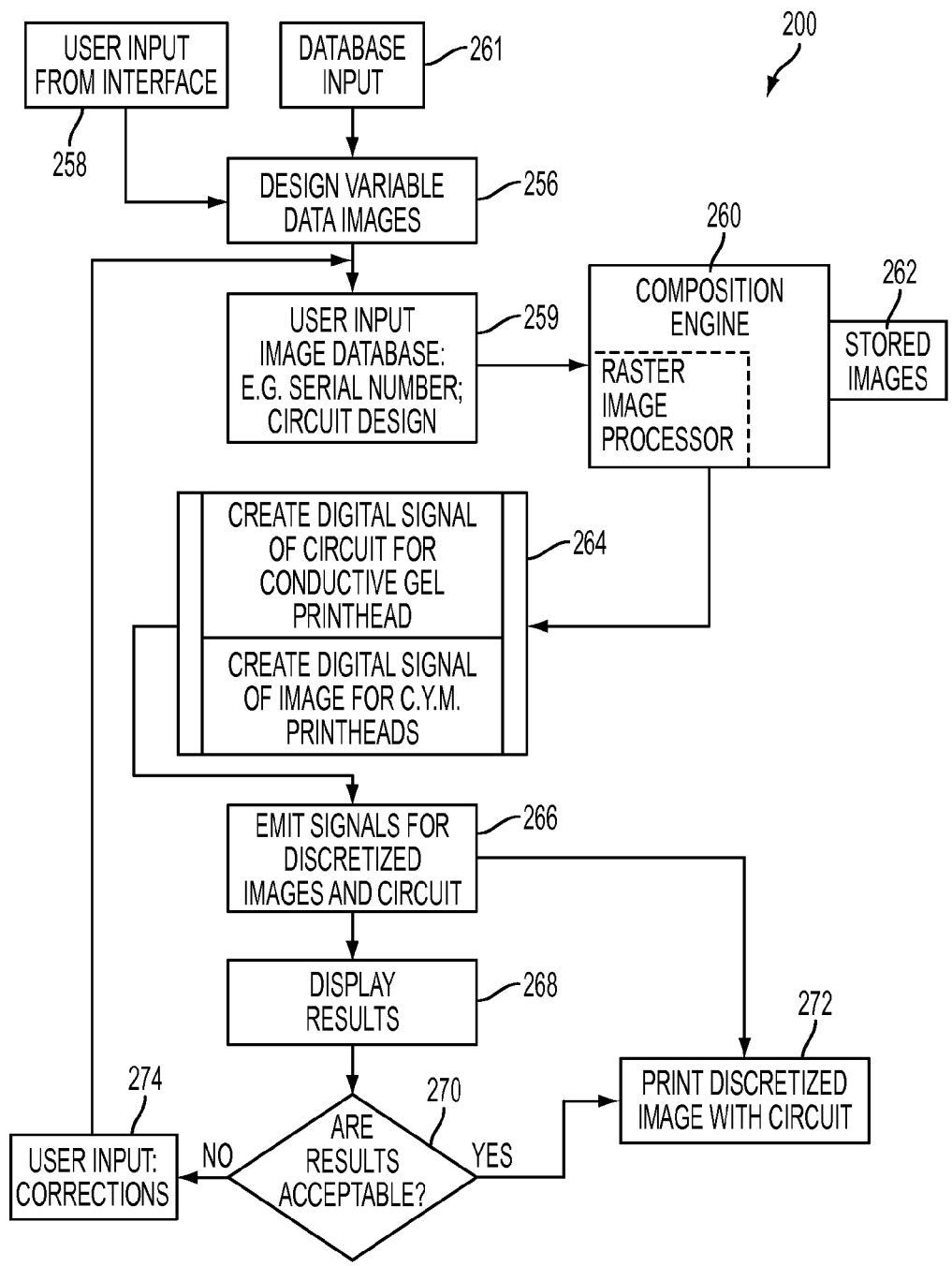
FIG. 3 is a block diagram of the operation of the system of FIG. 2.

Referring to FIG. 3, a block diagram of the operation of the system 200 is illustrated wherein the user creates time variable images at the user interface at step 256 from inputs from the interface at step 258 and the database at 261. The user inputs the discrete identification for the images at step 258. In the present practice, the discrete information inputted at step 258 may include such things as personnel name, serial no., stock no., model no., size, weight, and color, by way of example. The image with the discrete information is then inputted into a composition engine at step 260, which may include a raster image processor, and may also include stored images from storage source 262.

The composition engine at step 260 then creates a digital signal of the circuit to be marked by the conductive gel printhead E, at step 264; and, separate digital signals are also created at step 264 for the C, Y, M, K printheads and additional printheads as required. The composition engine at step 264 then emits signals at step 266 for the images and circuit containing the discrete information which is then displayed for the user at step 268, which may be at the user interface screen 212.

At step 270, the user determines whether the displayed results of the image are acceptable and, if the answer is affirmative, the image is printed at step 272. If the displayed results are not acceptable at step 270, the user then proceeds to input corrections at step 274 and the system returns to step 259. Alternatively, if desired, the system may be programmed to eliminate user review at step 270, and the program proceeds directly from step 266 and prints the images with the discrete information in the circuit at step 272.

Figure 4:
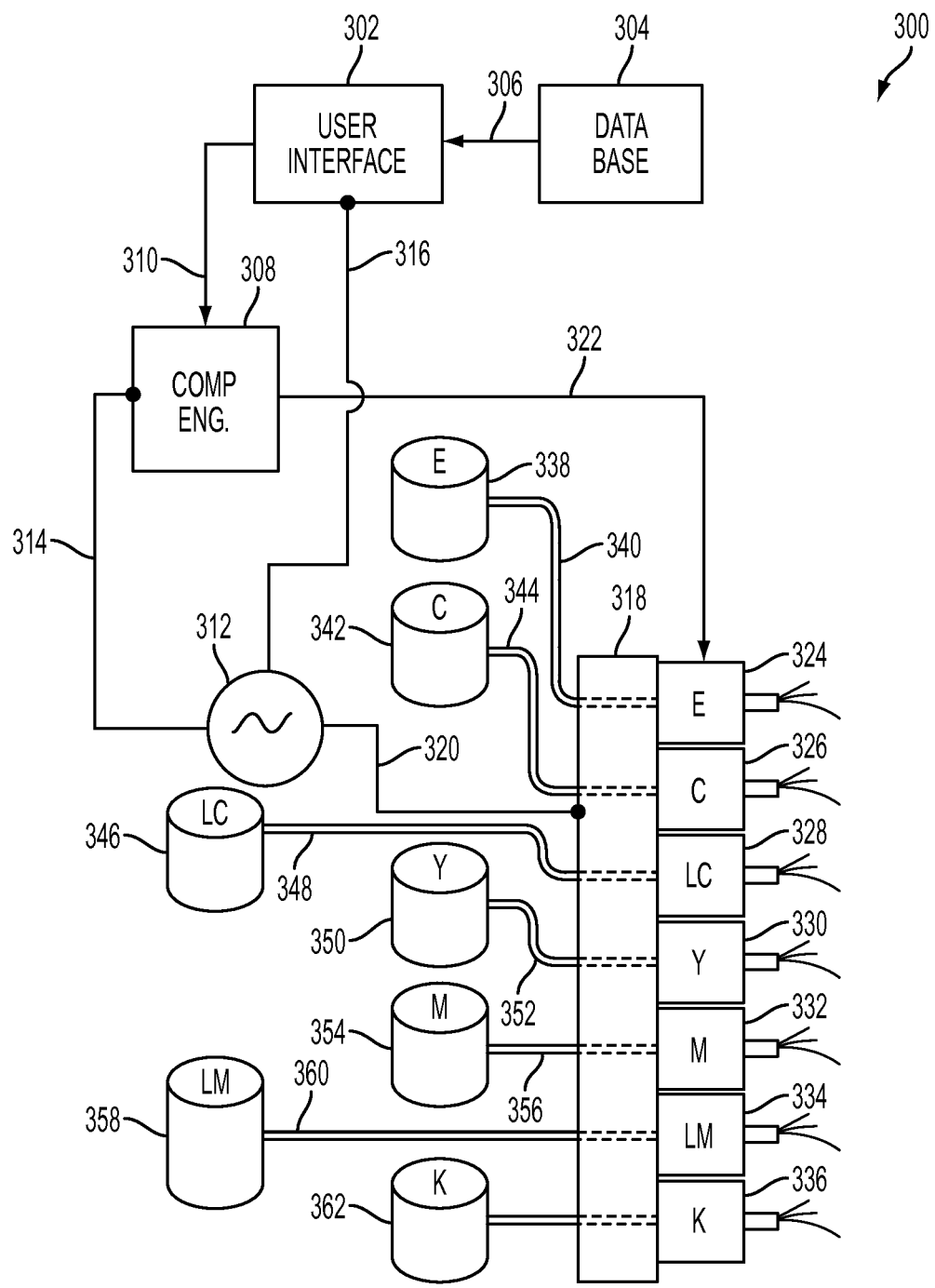
FIG. 4 is a schematic of another version of the system of FIG. 3.

Referring to FIG. 4, another version of the system according to the present disclosure is illustrated in the system indicated generally at 300 in which a user interface 302 receives images from a database 304 on signal line 306; and, images from the user interface 302 are inputted to a composition engine 308 as indicated by signal line 310. The composition engine 308 and user interface 302 receive power from a power supply 312, respectively, through power lines 314, 316. The power supply 312 also provides power to a heater 318, as indicated through power line 320. The arrangement of the user interface 302 and composition engine 308 are similar to that of the system 200 of FIG. 2.

The heater has attached thereto a separate printhead 324 of the droplet generator and nozzle type for the continuously conductive resin at E, as denoted by reference numeral 324. Additional separate printheads for cyan (C) colorant, reference numeral 326, light cyan (LC) at reference numeral 328, yellow (Y) at reference numeral 330, magenta (M), at reference numeral 332, light magenta (LM) at reference numeral 334, and black (K) at reference numeral 336 are attached to the heater 318. The composition engine 308 provides digital signals to the printheads for the continuously conductive resin and separate printheads for each of individual colorants as denoted by the line 322 in FIG. 4.

Continuously conductive resin is supplied from a reservoir or tank (E) in either particulate or gelatinous form, reference numeral 338, through a conduit 340 connected through heater 318 to printhead 324. The printhead 326 is supplied heated cyan (C) colorant resin from tank 342 through the heater 318 by a conduit 344.

A separate tank 346 is provided for the light cyan (LC) resin which inputs particles or gel through conduit 348 and through the heater 318 in a fluid state to the printhead 328.

Another tank 350 provides a supply of yellow (Y) colorant particles or gel through conduit 352 and through heater 318 in a fluid state to printhead 330. Another tank 354 provides a supply of magenta (M) colorant resinous particles or gel through conduit 356 and through the heater 318 in a fluid state to printhead 332. A separate tank or reservoir 358 provides a supply of light magenta (LM) colorant particles or gel through conduit 360 and through heater 318 in a fluid state for supplying heated gel to the printhead 334. Another tank 362 provides a supply of black (K) colorant resinous particles or gel through conduit 364 and through the heater 318 in a fluid state to printhead 336. It will be understood that the system 300 may be operated in accordance with flow diagram of FIG. 3.

Figure 5:
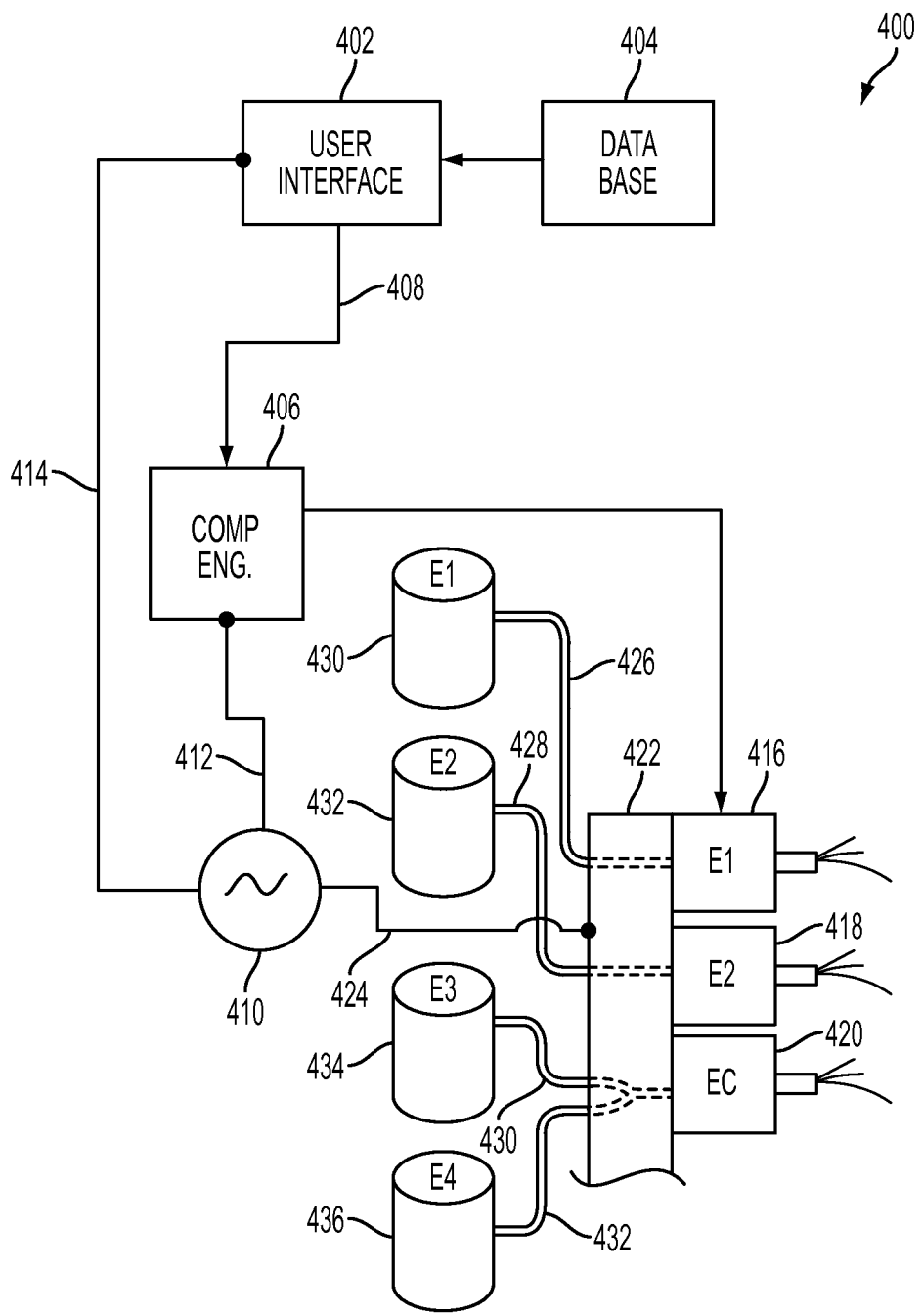
FIG. 5 is a schematic of an alternative version of the system of FIG. 4.

Referring to FIG. 5, another version of the system for practicing the method of the present disclosure is illustrated generally at 400 and includes user interface 402 receiving images from database 404. User interface provides image data for selected images to a composition engine 406, as indicated by signal line 408. The composition engine 406 and the user interface 402 receive electrical power from a source 140, as indicated respectively by power lines 412, 414. The composition engine 406 provides digital signals along signal line 407 to each of printheads 416, 418, 420.

The printheads 416, 418, 420 are connected to a heater 422, a portion of which is shown in FIG. 5, it being understood that the heater is illustrated as truncated and has an unshown portion thereof also connected to other individual colorant printheads (not shown). The heater receives power from power source 410 as indicated by power line 424. The printheads 416, 418 (E1, E2) are supplied, respectively, through conduits 426, 428 respectively, which pass through heater 422 and are connected to particulate resin tanks, respectively, 430, 432.

The printhead 420 (EC) is supplied a mixture of electrolyte resin through heater 422 which is supplied individually through conduits 430, 432, respectively, from particles or gel in tanks 434 (E3), 436 (E4). In operation, the printhead 420 lays down or prints/marks an electrolyte substrate. The printheads 416, 418 lay down or print, on the electrolyte substrate, individual electrodes thereby forming a battery circuit on the print media concurrently with the printing of the individual colorant of the image on the print media.

In the present practice, the electrolyte substrate from a mixture of resinous material either particles or gel from tanks E3, E4, heated and printed by printhead 420, may be a polymer gel obtained from Polyester Energy Corporation, Pleasanton, Calif. In the present practice, the electrolyte resin may be in either particulate or gel form in tanks E3, E4.

When the battery circuit is exposed to an electromagnetic wave, a voltage is generated such that the circuit can transmit an electromagnetic signal containing the discrete information printed in the circuit.

Although the printhead 420 for laying down or marking the electrolyte substrate on the print media is illustrated in FIG. 5 as supplied from a mixture from tanks 434 (E3) and 436 (E4), it will be understood that the printhead 420 may be supplied by a single constituent electrolyte resin supplied to the heater.

The present disclosure describes in one version a method of personalizing page images generated from information in a data base and enables user review, prior to printing, to allow the user to input changes or corrections prior to printing.

The present disclosure thus describes a method or a process for pre-proofing personalized images created by variable data inputs from a database and storing the personalized images. Data tags are entered in the information in the personalized images and the images scanned for data tags. The results of the scan are presented to the user for enabling correction inputs at the user interface prior to executing printing of the personalized images.

In other versions, the system provides for concurrently digitally marking or printing an image and a circuit with discrete information included in the circuit onto the print media with the image. The circuit enables subsequent irradiation of the image with an electromagnetic wave, such as a radio frequency wave, to provide a reflected wave including the discrete information include in the circuit. Thus, an RFID circuit can concurrently be printed digitally with an image onto the print media.

In another version, an electrolyte substrate is concurrently printed with an image and, a pair of the electrodes is concurrently digitally printed on the electrolyte substrate to form a battery circuit, on the digitally printed image on the print media. Upon subsequent receipt of an electromagnetic wave, such as a radio frequency wave, the battery is activated in the circuit to effect transmission of an electromagnetic radio frequency wave including the discrete information contained in the circuit. The method of the present disclosure, thus, permits RFID identification of images concurrently with the printing and eliminates the need for separate RFID tags to be separately attached to the media after the image has been printed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for concurrently digitally printing/marking an image with a circuit having discrete information on print media comprising
(a) a digital composition engine operative to generate digital image signals;
(b) an image data base;
(c) a user interface operatively connected to the data base including means for user input and connected to provide the digital image input to the composition engine;
(d) a first and second printhead each including a drop generator and a discharge nozzle and operatively connected to receive digital image signals from the composition engine;
(e) a first reservoir of resinous colorant in one of gelatinous and particulate form including a supply conduit connected to supply the resinous colorant to the first printhead;
(f) a second reservoir of continuously conductive resinous material in one of particulate and gelatinous form including a supply conduit connected to supply the continuously conductive resinous material to the second printhead; and,
(g) a heater operatively disposed to heat the resinous colorant material entering the first printhead and to heat the continuously conductive resinous material entering the second printhead wherein upon entry of discrete image information from the interface into the composition engine, the system is operative to concurrently print/mark a user selected image on the print media with colorant from the first printhead and print/mark a circuit with continuously conductive resinous material having discrete information thereon on the print media from the second printhead, wherein the second printhead is supplied from a mixture of conductive resinous material from a third and fourth reservoir.

2. The system of claim 1, wherein the composition engine includes a raster image processor.

3. The system of claim 1, wherein the resinous colorant material has a particle size of about 0.5 mm.

4. The system of claim 1, wherein the conductive resinous material includes particles of one of copper, silver, aluminum, nickel, and any combination thereof.

5. The system of claim 1, further comprising additional printheads and a reservoir of resinous colorant and a conduit supplying each of the additional printheads, wherein each of the additional reservoirs contains one of cyan (C), yellow (Y), magenta (M) and black (K) colorant gel.

6. The system of claim 5, further comprising additional printheads each supplied through a conduit from a reservoir of one of light cyan (LC) and light magenta (LM) colorant gel.

7. The system of claim 1, wherein the system is operable to display the image at the user interface before printing/marking.

8. The system of claim 7, wherein the user interface is operative to accept user inputs for connecting the displayed image prior to printing/marking.

9. The system of claim 1, wherein the user interface is operative to accept tactile inputs.

\* \* \* \* \*